United States Patent [19]

Foti

[11] Patent Number: 5,878,348

[45] Date of Patent: Mar. 2, 1999

[54] SYSTEM AND METHOD FOR IMPLEMENTING MULTIPLE HOME LOCATION REGISTERS FOR A SINGLE MOBILE STATION IN A CELLULAR TELECOMMUNICATIONS NETWORK

[75] Inventor: George Foti, Dollard des Ormeaux, Canada

[73] Assignee: Telefonaktiebolaget LM Ericsson (publ), Stockholm, Sweden

[21] Appl. No.: 655,458

[22] Filed: May 30, 1996

[51] Int. Cl.⁶ .................................................. H04Q 7/20
[52] U.S. Cl. ......................... 455/434; 455/422; 455/432; 455/433; 455/435
[58] Field of Search ..................................... 455/433, 445, 455/432, 417, 435, 413, 422, 458, 436, 406, 434

[56] References Cited

U.S. PATENT DOCUMENTS

| | | | |
|---|---|---|---|
| 4,677,653 | 6/1987 | Weiner et al. | 379/58 |
| 5,210,787 | 5/1993 | Hayes et al. | 455/435 |
| 5,437,053 | 7/1995 | Sawa et al. | 455/33.1 |
| 5,479,481 | 12/1995 | Koivunen | 455/435 |
| 5,490,201 | 2/1996 | Moberg et al. | 455/433 |
| 5,526,400 | 6/1996 | Nguyen | 455/432 |
| 5,537,457 | 7/1996 | Lantto et al. | 455/433 |
| 5,561,840 | 10/1996 | Alvesalo et al. | 455/433 |
| 5,610,974 | 3/1997 | Lantto | 455/433 |
| 5,621,783 | 4/1997 | Lantto et al. | 455/445 |
| 5,673,308 | 9/1997 | Akhavan | 455/417 |

*Primary Examiner*—Curtis A. Kuntz
*Assistant Examiner*—Yemane Woldetatios
*Attorney, Agent, or Firm*—Steven W. Smith

[57] ABSTRACT

In a cellular telecommunication network utilizing home location registers for completion of calls to and from a mobile station, a system and method is disclosed for loading and accessing database information relating to the mobile station, and completing calls to the mobile station while roaming in a visited foreign network without incurring long distance charges. The radio telecommunication system includes a mobile station having a mobile subscriber number (MSNB) and a first subscriber number (SNB), a home network having a mobile switching center (MSC) and a first home location register (HLR) which maintains database information relating to the mobile station, and a visited foreign network having a visited mobile switching center (V-MSC) and a second HLR. When the mobile station roams into the visited foreign network, a second SNB is assigned to the MSNB, and subscriber information is stored in the second HLR. When a call is received for the mobile station on the second SNB, the V-MSC accesses the second HLR for subscriber information and completes the call locally to the mobile station.

12 Claims, 4 Drawing Sheets

SYSTEM AND METHOD FOR IMPLEMENTING MULTIPLE HOME LOCATION REGISTERS FOR A SINGLE MOBILE STATION IN A CELLULAR TELECOMMUNICATIONS NETWORK

BACKGROUND OF THE INVENTION

1. Technical Field of the Invention

This invention relates to cellular telephone networks, and more particularly, to a system and method of implementing multiple home location registers for a single mobile station.

2. Description of Related Art

In standard cellular radio communication networks, a subscriber's mobile telephone station is assigned a unique Mobile Subscriber Number (MSNB) and telephone number (SNB) which are associated with the Home Location Register (HLR) of the subscriber's home network. The HLR maintains mobile subscriber profile information for mobile stations having a MSNB in the MSNB series assigned to the HLR in the subscriber's home network. This profile includes, among other things, information indicative of a mobile station's location.

The SNB is the public telephone number of the mobile station and is used when operating the station in either its home or a foreign network. The SNB is a local number within the home network. If the subscriber leaves the home network, and receives a call, long distance charges are incurred by either the subscriber, the calling party, or both.

Calls to the SNB from the public switched telephone network (PSTN) are routed to a gateway mobile switching center (G-MSC) of a local cellular communications network. The G-MSC consults the subscriber's HLR via a location request (LOCREQ) invoke message for profile information regarding the location of the subscriber's mobile station and related service information. The G-MSC then forwards a routing request (ROUTREQ) invoke message from the HLR to a mobile switching center (MSC) where the subscriber's mobile station is currently located, if active. The EIA/TIA signaling standards typically followed for incoming calls to a subscriber's home network are set forth in Intersystem Signaling Standard IS-41 which is hereby incorporated by reference herein.

As currently implemented, calls to a SNB are routed through the single HLR assigned to the MSNB series of the subscriber's MSNB. If the subscriber frequently travels in a foreign network, all status inquiries are routed through the HLR of the subscriber's home network, resulting in long distance charges to both the subscriber and calling party. This is true even when both the subscriber and calling party are operating within the local calling area of the foreign network. If a subscriber desires to utilize a local number in a foreign network to avoid long distance charges, the subscriber must either significantly modify the hardware and programming of his mobile station or utilize a totally different mobile station and SNB for calls in the foreign network.

Although there are no known prior art teachings of a solution to the aforementioned deficiency and shortcoming such as that disclosed herein, a number of prior art references exist that discuss subject matter which bears some relation to the matters disclosed herein. Such prior art references are U.S. Pat. Nos. 4,677,653 and 5,437,053. Each of these references is discussed briefly below.

U.S. Pat. No. 4,677,653 to Weiner, et al (Weiner), discloses an adaptor for a cellular mobile phone unit that converts the mobile unit to operate with a plurality of telephone numbers. A plurality of read only memories (ROMs) are each programmed with a unique SNB number code that may be selectively accessed to choose a different telephone number for the mobile unit. Weiner neither teaches nor suggests, however, a means for supporting multiple SNBs without modification of the mobile telephone hardware. Weiner requires modification of the mobile unit itself, as well as connection of an adaptor to the internal microprocessor of the mobile unit.

U.S. Pat. No. 5,437,053 to Sawa, et al (Sawa), discloses a mobile telephone unit modified for storing a plurality of mobile identification numbers (MIDs). A user may select any of the stored MIDs for receiving telephone calls. When the mobile unit receives a MID transmitted from a cellular network base station, the mobile unit searches for a match between the incoming MID and one of the stored or selected MIDs. If the received MID corresponds with either a stored or selected MID, the mobile unit is enabled to communicate with the base unit. As in Weiner above, however, Sawa requires modification of the mobile telephone unit itself and neither teaches nor suggests a system or method for supporting multiple SNB without hardware modifications and programming changes to the standard mobile station.

It would be a distinct advantage to have a system and method of enabling roaming cellular subscribers to utilize unmodified mobile stations to originate or receive calls in a foreign network without incurring long distance charges. Such a system and method would enable a mobile station to receive calls on a second SNB, would be implemented entirely in the cellular network, and thus would not require hardware modification or reconfiguration of the mobile station. Review of each of the foregoing references reveals no disclosure or suggestion of a system or method such as that described and claimed herein.

SUMMARY OF THE INVENTION

The present invention is a system and method that enables roaming cellular subscribers to utilize unmodified mobile stations to originate or receive calls in a foreign network without incurring long distance charges. The system enables a mobile station to receive calls on a second SNB, and is implemented entirely in the cellular network. Therefore, the present invention does not require hardware modification or reconfiguration of the mobile station. This is accomplished by enabling a single mobile station to utilize multiple home location registers in a cellular communication network. The cellular communication network includes a plurality of network exchanges, each exchange including a mobile switching center and a home location register.

According to one embodiment of the present invention, a radio telecommunications system is provided including a mobile station associated with a home network, at least one foreign network, a means for loading database information related to said mobile station in said foreign network and a means for directing the telecommunications system to utilize the resources of the foreign network to obtain database information related to the mobile station. The home network has a mobile switching center (MSC) and a first home location register (HLR) and the foreign network has a visited mobile switching center (V-MSC) and a second HLR.

According to another embodiment of the present invention, a radio telecommunications system is provided which includes a mobile station having a MSNB and a first SNB associated with a home network. The home network includes a MSC and a first HLR. The system also includes a plurality of foreign networks, with each of the foreign networks having a V-MSC and a HLR. Additionally, the system has a means for loading database information related to the mobile station in at least one of the foreign networks, and a means for directing the V-MSC receiving a call for the mobile station to utilize the resources of its associated foreign network to obtain database information related to the mobile station.

In another aspect, the present invention is a method of completing a call to a mobile station roaming in a foreign network without incurring long distance charges. The method includes the steps of assigning a single MSNB to the mobile station, and associating a plurality of HLRs with the MSNB. The step of associating a plurality of HLRs with the MSNB may include the steps of assigning a first SNB to the MSNB, where the first SNB is associated with a first HLR in a home network, and assigning a second SNB to the MSNB, where the second SNB is associated with a second HLR in a first foreign network. The assignment of the second SNB to the MSNB may be temporary or may be permanent.

In yet another aspect of the present invention, the method further comprises the step of assigning a third SNB to the MSNB, where the third SNB is associated with a third HLR located in a second foreign network.

According to one embodiment of the present invention, the step of assigning a second SNB to the MSNB includes the steps of loading database information related to said mobile station into the database of the second HLR and directing the telecommunications system to utilize the second HLR to obtain information regarding the mobile station. The step of directing the telecommunications system to use the second HLR comprises the step of defining the single MSNB and second SNB in the database of the V-MSC.

In another aspect, the present invention is a method of completing an incoming call to a single mobile station in a mobile telecommunications system utilizing any one of a plurality of SNBs. The steps include assigning a single MSNB to the mobile station, associating a plurality of HLRs with the MSNB, receiving an incoming call to one of the plurality of SNBs, identifying the HLR associated with the called SNB, interrogating the identified HLR for location information regarding the mobile station, and routing the incoming call to the mobile station.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method that enables roaming cellular subscribers to utilize unmodified mobile stations to originate or receive calls in a foreign network without incurring long distance charges. The system is implemented entirely in the cellular network, and thus does not require hardware modification or reconfiguration of the mobile station. This is accomplished by enabling a single mobile station to utilize multiple home location registers in a cellular communication network.

The present invention selectively associates with the mobile station, one of a plurality of HLRs containing information on the subscriber's location. When the mobile station enters a visited foreign network, the subscriber registers in a local HLR with a new subscriber number (SNB). When a call is received for the subscriber using the new SNB, the foreign network accesses the local HLR for subscriber information, thereby avoiding the charges which would normally be incurred by calling the subscriber using his old SNB.

Figure 1:
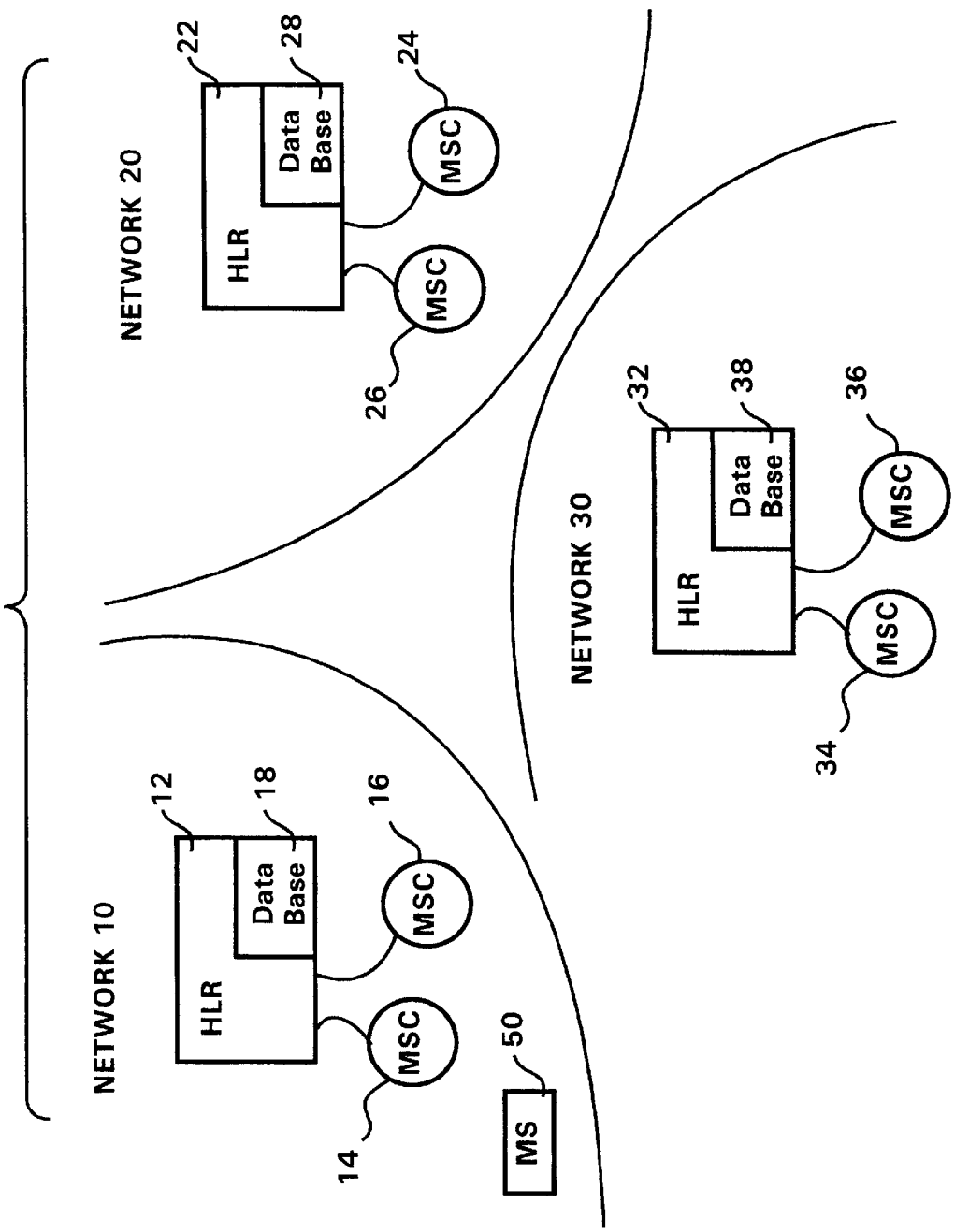
FIG. 1 (Prior Art) is a block diagram illustrating a conventional cellular telecommunication system to which the present invention may be generally applied.

Referring first to FIG. 1, a conventional radio telecommunications system of the type known in the art is shown. Multiple cellular networks 10, 20, and 30 each have a plurality of mobile switching centers (MSCs) 14, 16, 24, 26, 34 and 36, each associated with a network home location register (HLR) 12, 22, or 32. The depiction of each network as supporting two MSCs, as well as a single HLR is by way of example only and not limitation. It will be understood and appreciated by those skilled in the art that cellular networks may support a plurality of MSCs and HLRs, each HLR supporting at least one mobile subscriber number series (MSNB series) within the region of the network.

In the example shown, a subscriber's mobile station 50 is assigned a unique mobile subscriber number (MSNB) which is part of a first MSNB series and a unique telephone number (SNB). The unique MSNB and SNB are associated with mobile station 50 within a database 18 of the home location register 12 of the subscriber's home network 10. Each HLR 12, 22, and 32 has a database 18, 28, and 38, and supports at least one MSNB series. Subscriber mobile stations having a MSNB in the first MSNB series are assigned HLR 12 and network 10 as their home network. Mobile stations assigned HLRs 22 and 32 and networks 20 and 30 as their respective home network may share the same MSNB series, but have local SNBs associated with networks 20 and 30.

For purposes of illustration only, the first MSNB series may be defined as including the number series 1235551200 through 1235551299. Mobile station 50 may be assigned an MSNB equal to 1235551212 and a corresponding SNB equal to 1235551212. Therefore, mobile station 50 has network 10 as its home network and database 18 of HLR 12 contains the related subscriber profile information. Whenever the subscriber for mobile station 50 roams in networks 20 or 30, the MSNB alerts the visited MSC to obtain subscriber information from HLR 12. Signaling messages for incoming calls to the mobile station 50 include long distance interrogation of HLR 12.

Completion of an incoming call to mobile station 50, will now be described with reference to FIG. 2. Mobile station 50 is shown operating and receiving calls while roaming in foreign network 20. An incoming call from PSTN 40 to the SNB of mobile station 50, is routed by the PSTN to a gateway MSC (G-MSC) 16 in the mobile subscriber's home network 10. G-MSC 16 then interrogates HLR 12 for subscriber information regarding mobile station 50.

After receiving a location request (LOCREQ) message from G-MSC 16, HLR 12 determines that Mobile Station 50 is active in visited network 20 and MSC 26. Using standard IS 41 signaling, a temporary location directory number (TLDN) is received from MSC 26, and G-MSC 16 establishes a long distance voice trunk to MSC 26. It will be understood and appreciated by those skilled in the art that the actual communication along signal lines between and among the various elements of the exchanges may vary depending upon the design of the telecommunications system and the demands placed thereon at the time of the incoming call.

Figure 2:
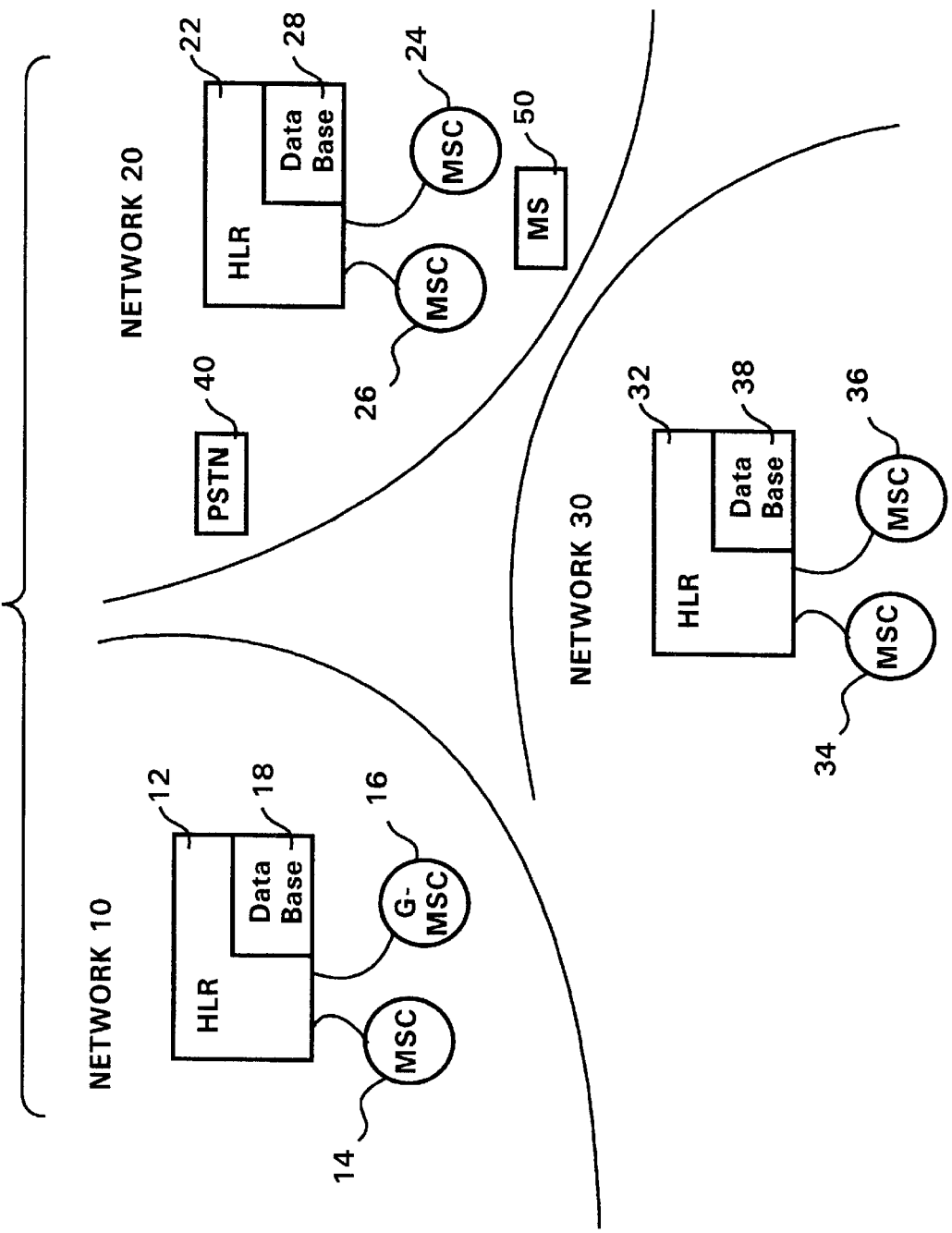
FIG. 2 (Prior art) is a block diagram illustrating the operation of a standard cellular telecommunication system wherein the mobile station is active in a foreign network and receives an incoming call from the local calling area of the foreign network.

As illustrated in FIG. 2, long distance establishment of the call from the PSTN 40 to the G-MSC 16, and interrogation of HLR 12, results in long distance charges to the calling party. Thereafter, establishment of the voice trunk from G-MSC 16 to MSC 26 results in long distance charges to the mobile subscriber. Therefore, both subscribers incur long distance charges even though both parties are operating within the same local region of foreign network 20.

Figure 3:
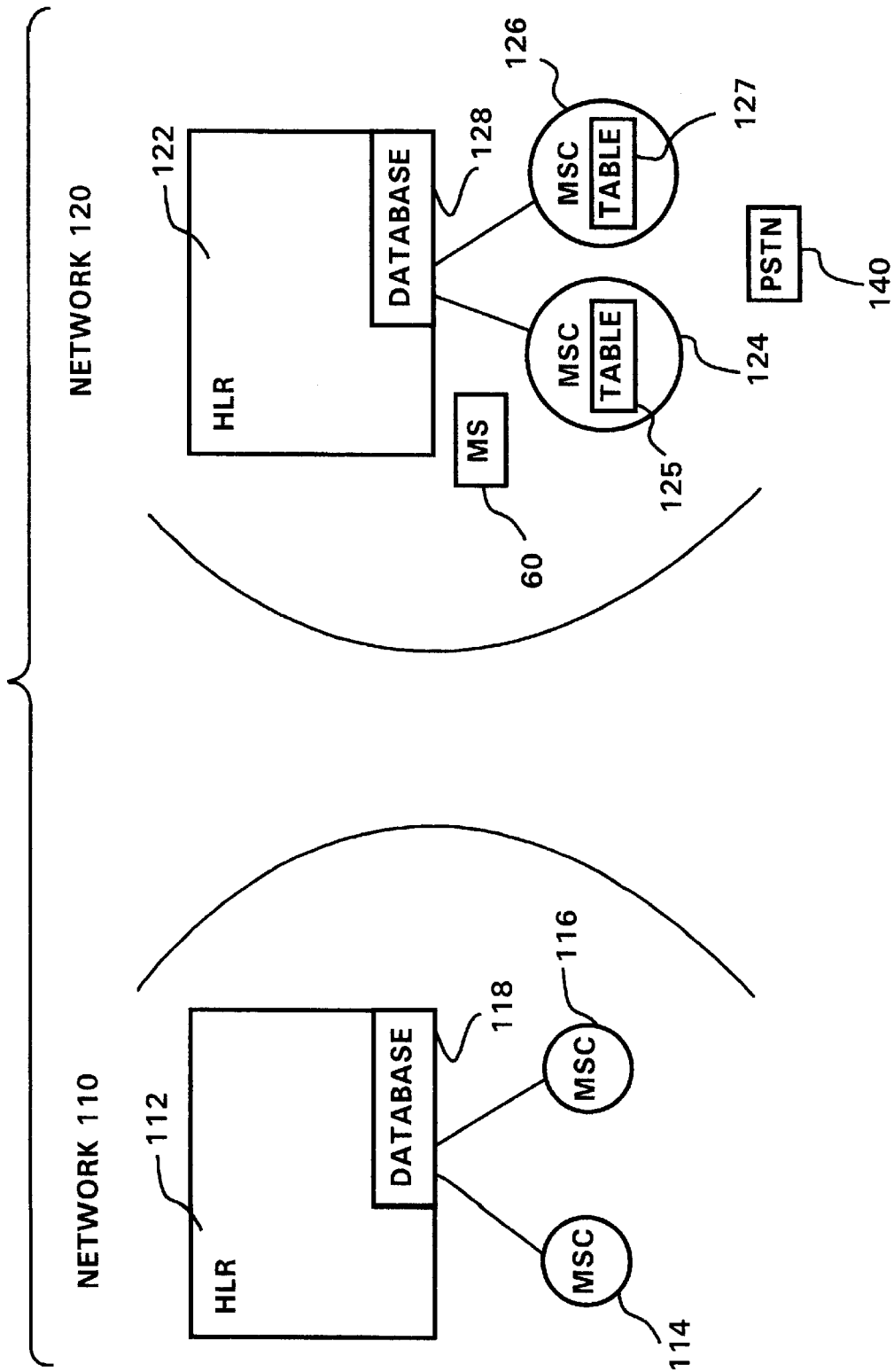
FIG. 3 is a block diagram illustrating the operation of an embodiment of the system of the invention wherein the mobile station is active in a foreign network and receives an incoming call from the local calling area of the foreign network in accordance with the teachings of the present invention.

FIG. 3 is a block diagram illustrating the operation of an embodiment of the system of the invention wherein the mobile station is active in a foreign network and receives an incoming call from the local calling area of the foreign network. The system of the present invention includes a mobile station 60 having a unique mobile subscriber number (MSNB), a plurality of home location registers (HLRs), and a means for selectively associating the mobile station with one or more of the plurality of HLRs. As shown in FIG. 3, a home network 10 includes MSCs 114 and 116, and HLR 112. A foreign network 120 includes MSCs 124 and 126, HLR 122, and software commands directing the system to selectively access one of the HLRs of either network 110 and 120 when the mobile station 60 is operating there. HLRs 112 and 122 each maintain databases 118 and 128 of subscriber information with regard to any mobile stations having their respective networks 110 or 120 as the station's home network.

Mobile station 60 has a unique mobile subscriber number (MSNB) and a first subscriber number (SNB). The unique MSNB is one of a first mobile subscriber series (MSNB) supported by home network 110 and HLR 112. The system may selectively access HLR 112 or HLR 122. When the mobile subscriber travels to visited network 120, database information relating to mobile station 60 may be loaded into HLR 122 upon the subscriber's request. MSCs 124 and 126 of the foreign network 120 then interrogate HLR 122 for information relating to mobile station 60. The database information relating to mobile station 60 may be loaded into HLR 122 by assigning a second SNB, local to foreign network 120, to the unique MSNB of the mobile station. A database entry is made in table 125 and table 127 of MSC 124 and MSC 126, respectively, to direct MSC 124 or MSC 126 to access HLR 122 for the loaded database information.

After the second SNB has been assigned, subscriber profile information relating to mobile station 60 is entered into the database 128 of visited network 120, including a definition of the second SNB and the unique MSNB of mobile station 60. An entry is also made into the database tables 125 and 127 of each associated MSC 124 and 126, setting the second SNB equal to the unique MSNB of mobile station 60 and directing the MSC to interrogate HLR 122 for any information regarding mobile station 60 whenever the subscriber roams in either MSC 124 or MSC 126.

It will be understood and appreciated by those skilled in the art that the system may include a plurality of foreign networks which each have an additional SNB either temporarily or permanently assigned to the unique MSNB of a single mobile station and supported by the HLR associated with each foreign network. For example, the subscriber of mobile station 60 may request an additional third SNB in a third network (not shown). The third SNB is assigned to the unique MSNB in the appropriate database of the third network HLR and in tables of the third network MSCs.

Figure 4:
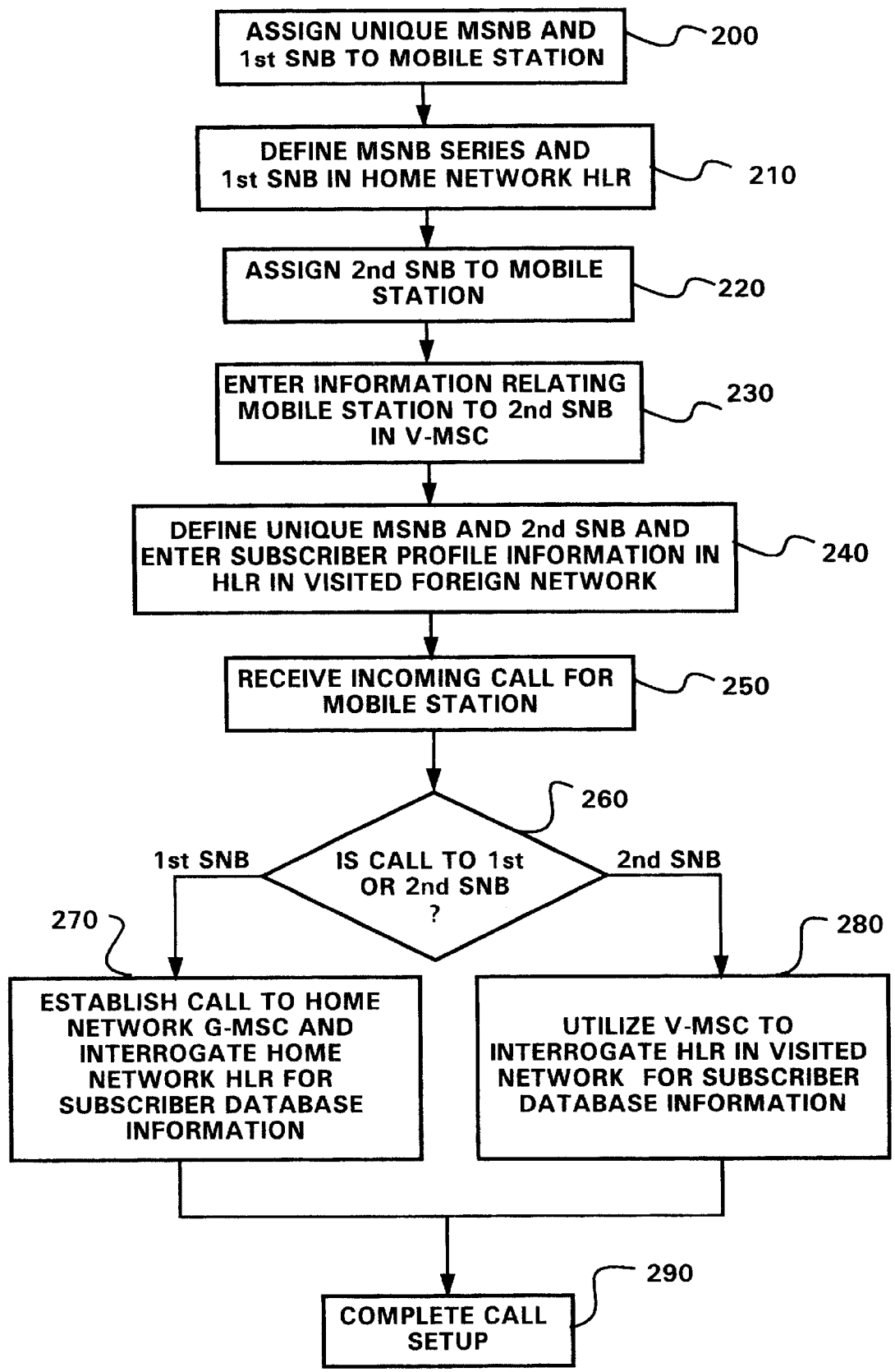
FIG. 4 is a flow chart illustrating an embodiment of a method of the present invention by which multiple home location registers are associated with a single mobile station in a radio telecommunications network.

FIG. 4 is a flow chart illustrating an embodiment of a method of the present invention by which multiple home location registers are associated with a single mobile station in a radio telecommunications network. The process begins at step 200 where a mobile station is assigned a single mobile subscriber number (MSNB) which is a member of a MSNB series, and a first subscriber number (SNB). At step 210, the first SNB and MSNB series are defined in the database of a home network HLR. At step 220, a second SNB is assigned to the mobile station. When the subscriber roams into a visited foreign network, the process moves to step 230 where information relating the mobile station to the second SNB is entered into a table of a visited MSC (V-MSC) of the visited foreign network. The process then moves to step 240 where the unique MSNB and the second SNB are defined in the database of a home location register associated with the V-MSC of the visited foreign network, and selected subscriber profile information is entered before proceeding with call delivery to the mobile station. Hence, when the subscriber roams in the V-MSC, he registers in the HLR associated with that V-MSC.

At step 250, the system receives an incoming call to the mobile station in the visited foreign network. At step 260, if the call is to the first SNB assigned to the mobile station, the system moves to step 270 and establishes the call to a G-MSC in the subscriber's home network, and interrogates the home network HLR for database information related to the mobile station before competing the call setup at step 290. If the incoming call is to the second SNB, however, the system moves from step 260 to step 280 and utilizes the V-MSC to interrogate the local HLR in the visited network for database information related to the mobile station, and then completes call setup locally at step 290.

Thus far, the description of the present invention has focused on incoming calls terminating at the roaming mobile station. However, it should be understood that once a roaming subscriber has registered with a new SNB in the HLR of a V-MSC, all toll tickets are generated using the new SNB. In other words, calls originating from the mobile station in the V-MSC are charged according to the set tolls for calls from that V-MSC. Calls from the mobile station to local numbers in the V-MSC are charged as local calls, and calls that are long distance calls from that V-MSC are charged the applicable long distance rates.

It is thus believed that the operation and construction of the present invention will be apparent from the foregoing description. While the method, and system shown and described has been characterized as being preferred, it will be readily apparent that various changes and modifications could be made therein without departing from the spirit and scope of the invention as defined in the following claims.

What is claimed is:

1. In a radio telecommunication system having a home network associated with a mobile station, a foreign network, and a plurality of home location registers, wherein each HLR has a database for storing information relating to assigned mobile stations, a method of completing a call to said mobile station while said mobile station operates in said foreign network without incurring long distance charges, said method comprising the steps of:

assigning a single mobile subscriber number (MSNB) which is a member of a MSNB series and a first subscriber number (SNB) to the mobile station;

defining the MSNB series and first SNB in the database of a first HLR, wherein the first HLR is associated with the home network, said home network having a mobile switching center (MSC);

assigning a second SNB to the mobile station;

defining the single MSNB and the second SNB in the database of a second HLR, wherein the second HLR is associated with a first visited foreign network, said first visited foreign network having a visited mobile switching center (V-MSC);

receiving an incoming call for the mobile station, said incoming call utilizing the second SNB;

interrogating the second HLR for database information related to said mobile station; and routing the incoming call to the mobile station.

2. The method of claim 1 wherein the step of assigning a second SNB to the mobile station includes creating a database entry in the V-MSC which associates the single MSNB and the second SNB of the mobile station with the second HLR.

3. The method of claim 1 wherein the step of defining the single MSNB and second SNB in the database of the second HLR includes making a temporary database entry.

4. The method of claim 1 wherein the step of defining the single MSNB and second SNB in the database of the second HLR includes making a permanent database entry.

5. In a radio telecommunication system having a home network associated with a mobile station, a foreign network, and a plurality of home location registers, wherein each HLR has a database for storing information relating to assigned mobile stations, a method of completing a call to said mobile station while said mobile station operates in said foreign network without incurring long distance charges, said method comprising the steps of:

assigning a single mobile subscriber number (MSNB) which is a member of a MSNB series and a first subscriber number (SNB) to the mobile station;

defining the MSNB series and first SNB in the database of a first HLR, wherein the first HLR is associated with the home network, said home network having a mobile switching center (MSC);

assigning a second SNB to the mobile station;

defining the single MSNB and the second SNB in the database of a second HLR, wherein the second HLR is associated with a first visited foreign network, said first visited foreign network having a visited mobile switching center (V-MSC);

receiving an incoming call for the mobile station;

determining whether said incoming call is on the first SNB or the second SNB;

establishing the incoming call to a MSC in the home network and interrogating the first HLR for information regarding said mobile station upon determining that said incoming call is on the first SNB;

utilizing the V-MSC to interrogate the second HLR for information regarding said mobile station upon determining that said incoming call is on the second SNB; and routing the incoming call to the mobile station.

6. In a radio telecommunications network, a system for completing an incoming call to a mobile station operating in a visited foreign network without incurring long distance charges, said system comprising:

a mobile station having a mobile subscriber number (MSNB) and a first subscriber number (SNB), said MSNB being one of a plurality of MSNBs associated with a mobile subscriber number series (MSNB series);

a home network associated with said mobile station, said home network having a mobile switching center (MSC) and a first home location register (HLR), wherein said first HLR is assigned the MSNB series and maintains database information relating to said mobile station;

a visited mobile switching center (V-MSC) located in a first visited foreign network, said V-MSC being associated with a second HLR;

means for loading database information relating to said mobile station in said second HLR;

means for directing said V-MSC to access said second HLR for said database information relating to said mobile station; and means for completing said call locally within said visited foreign network.

7. The system of claim 6 wherein said means for loading database information relating to said first mobile station in said second HLR includes a means for assigning a second SNB to said MSNB of the mobile station.

8. The system of claim 6 wherein said means for directing said V-MSC to access said second HLR for said loaded database information relating to said first mobile station includes a database entry in said V-MSC directing said V-MSC to interrogate the second HLR whenever said incoming call is on the second SNB.

9. In a radio telecommunications network, a system for completing an incoming call to a mobile station operating in a visited foreign network without incurring long distance charges, said system comprising:

a mobile station having a mobile subscriber number (MSNB) and a first subscriber number (SNB), said MSNB being one of a plurality of MSNBs associated with a mobile subscriber number series (MSNB series);

a home network associated with said mobile station, said home network having a mobile switching center (MSC) and a first home location register (HLR), wherein said first HLR is assigned the MSNB series and maintains database information for said mobile station;

a plurality of visited foreign networks, each of said foreign networks having a visited mobile switching center (V-MSC) and an associated visited HLR;

means for loading database information relating to said mobile station in each said visited HLR;

means for directing the V-MSC of each said visited foreign network to access its associated visited HLR for said database information relating to the mobile station; and means for completing said call locally within said visited foreign network.

10. The system of claim 9 wherein said means for loading database information relating to said mobile station in each said visited HLR includes a means for associating a different one of a plurality of SNBs with the MSNB in each said visited HLR.

11. The system of claim 10 wherein said means for directing each said V-MSC to access its associated visited HLR for said loaded database information relating to said mobile station includes a database entry in each of said V-MSCs directing each V-MSC to interrogate its associated HLR whenever said incoming call is on the SNB associated with its associated HLR.

12. In a radio telecommunication system, a method of originating a call from a mobile station roaming in a foreign network, and completing said call to a local number in said foreign network without incurring long distance charges, said radio telecommunication system having a home network associated with said mobile station, and a plurality of home location registers, wherein each HLR has a database for storing information relating to assigned mobile stations, said method comprising the steps of:

assigning a single mobile subscriber number (MSNB) which is a member of a MSNB series and a first subscriber number (SNB) to the mobile station;

defining the MSNB series and first SNB in the database of a first HLR, wherein the first HLR is associated with the home network, said home network having a mobile switching center (MSC);

assigning a second SNB to the mobile station;

defining the single MSNB and the second SNB in the database of a second HLR, wherein the second HLR is associated with a first visited foreign network, said first visited foreign network having a visited mobile switching center (V-MSC);

originating a call from the mobile station to a local telephone number in the V-MSC, said call utilizing the second SNB; and routing the call to the local telephone number.

* * * * *